United States Patent
Shiozawa et al.

(10) Patent No.: US 7,161,883 B2
(45) Date of Patent: Jan. 9, 2007

(54) INFORMATION RECORDING METHOD AND OPTICAL DISK APPARATUS

(75) Inventors: Akinori Shiozawa, Yokohama (JP); Horoaki Ono, Fujisawa (JP); Hisataka Sugiyama, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 635 days.

(21) Appl. No.: 10/442,430

(22) Filed: May 20, 2003

(65) Prior Publication Data

US 2005/0088936 A1 Apr. 28, 2005

(30) Foreign Application Priority Data

Jan. 31, 2003 (JP) ............................. 2003-022984

(51) Int. Cl.
*G11B 5/09* (2006.01)
(52) U.S. Cl. ............... 369/53.2; 369/53.16; 369/53.17; 369/47.1; 369/59.25
(58) Field of Classification Search ..................... None
See application file for complete search history.

(56) References Cited

U.S. PATENT DOCUMENTS 5,210,734 A * 5/1993 Sakurai ................... 369/47.16
5,388,105 A * 2/1995 Takagi et al. ............ 369/44.32
6,128,273 A * 10/2000 Horie et al. ............. 369/275.4

FOREIGN PATENT DOCUMENTS

JP    A 9 270171    10/1997
JP    A 11 25459    1/1999

* cited by examiner

*Primary Examiner*—Muhammad Edun
(74) *Attorney, Agent, or Firm*—Townsend and Townsend and Crew LLP

(57) ABSTRACT

When user data is recorded on a write-once medium, linking variations can be reduced that are produced as management information for managing the user data is updated by additionally recording on and off, thereby assuring the reliability of the reproduction compatibility of the DVD player.

Before the final file of the management information is recorded, dummy data of a plurality of successive blocks are recorded at a time by a single operation, and then the final file is additionally recorded after the dummy data. Therefore, the linking precision can be prevented from being degraded in the linking portions of the management information, and thus the management information can be properly read when the DVD player makes compatible reproduction of the medium.

12 Claims, 9 Drawing Sheets

INFORMATION RECORDING METHOD AND OPTICAL DISK APPARATUS

BACKGROUND OF THE INVENTION

The present invention relates to a technique of data recording on a recordable optical disk.

The optical disk is able to store a large amount of information and has a feature of compatibility.

Of all kinds of optical disks, DVD (Digital Versatile Disk) that can store a large amount of information for computer, video images and music on the same recording medium has attracted our attention as a new large-capacity recording medium for PC and AV. The popularization of playback-only DVD player and the appearance of DVD recorders that can also record DVD are rapidly expanding the DVD market.

As the recordable optical disk becomes widely used, the user has treated the optical disk compatibility as important. However, since most of widespread DVD players do not support DVD-RAM (DVD-Random Access Memory) and DVD-RW(DVD-ReWritable) as the rewritable formats that some DVD recorders employ; they have no compatibility and thus cannot reproduce the rewritable DVD-RAM optical disks and so on. Therefore, when setting the DVD-R (DVD-Recordable) standard that complies with the DVD-video format, we will see a current movement to support the DVD-R media which are recordable optical disks to assure high compatibility.

During the real-time recording of data on a disk by a recorder, we sometimes switches off the power supply to the recorder or takes the disk out of the recorder when arbitrary data has been recorded before data is completely recorded on the entire surface of the disk. At this time, in order to assure to additionally record new data continuously to the already recorded data, it is necessary to manage the data recorded up to that time on the disk. Therefore, management information (hereafter, called intermediate IFO file) to manage this disk is updated each time data is recorded.

Figure 1:
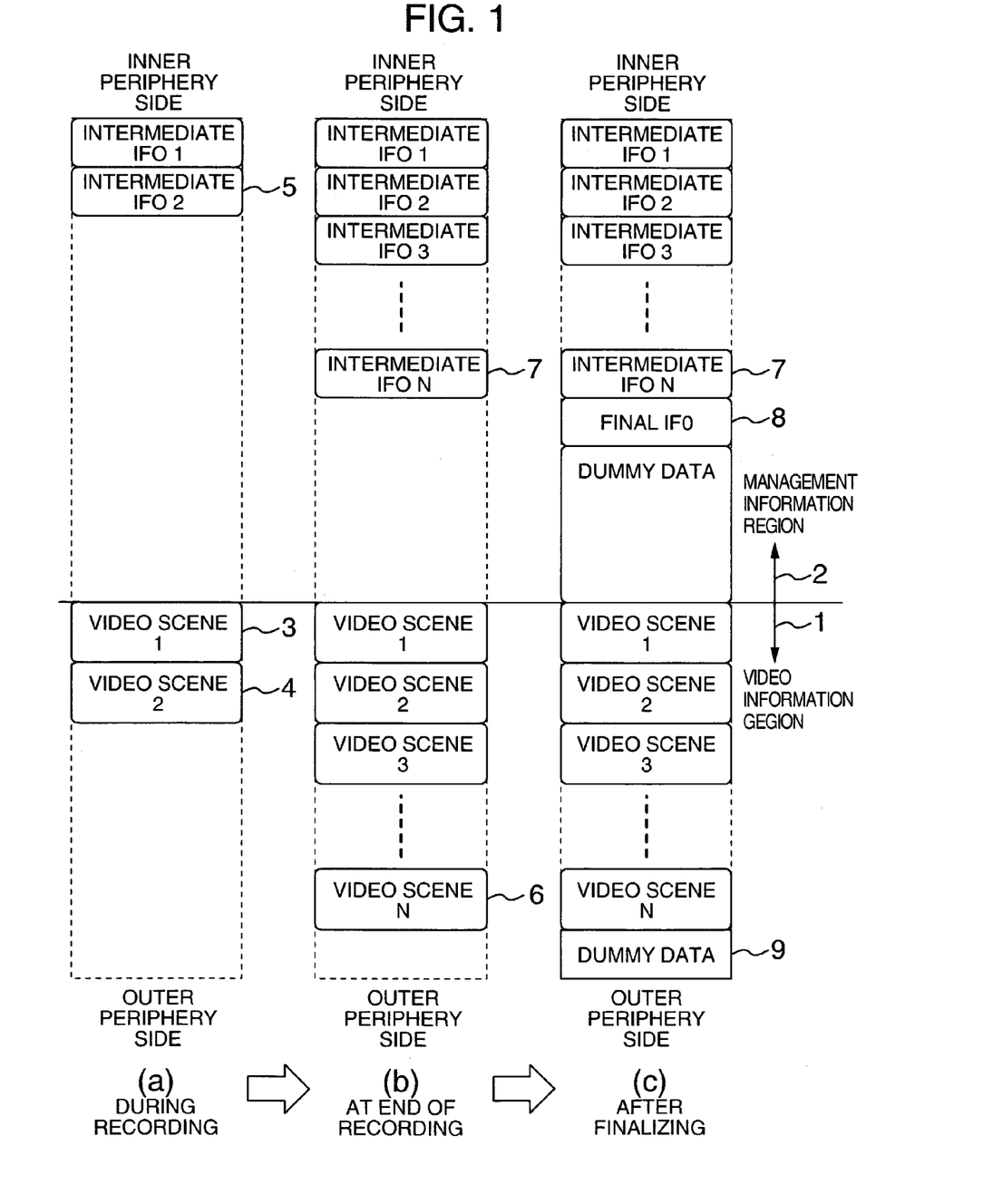
FIG. 1 is a diagram showing the state in which the intermediate IFO files are updated on a DVD-R when the video scene data are recorded in a form of files.

FIG. 1 shows the updating of intermediate IFO file on a DVD-R when data of video scene is recorded in a form of file. The disk-recording region is generally divided into a region for recording user data (video information region 1) and a management information region 2 for managing files of data recorded on the disk according to the kind of disk. FIG. 1(a) shows a positional relation between the intermediate IFO file and each video-scene file on a DVD-R when video-scene 2 has been recorded. The file 4 of video-scene 2 is additionally recorded continuous to the file 3 of video-scene 1. In addition, since the file 4 of video-scene 2 is added to change the file structure on the disk, the intermediate IFO file 2 (as indicated by reference numeral 5) is recorded in turn to update the management information.

Since the DVD-R is a write-once medium, a new intermediate IFO file cannot be recorded on the old intermediate IFO file, or overwritten thereon. Thus, when the management information is updated, a new intermediate IFO file is recorded in turn continuous to the previously recorded one as in the video information region 1. Accordingly, the finally added intermediate IFO file indicates the latest file structure on the disk.

FIG. 1(b) shows the state that files of video scene have further been recorded from the state of FIG. 1(a) up to the file 6 of video scene N where there is no recording space, or no video scene can no longer be recorded. At this time, the file structure on the DVD-R is concluded, and the information for managing that state is indicated by the intermediate IFO file N (represented by numeral 7). Thus, by reproducing the intermediate IFO file N (represented by 7), it is possible to access to all video-scene files.

However, the DVD player cannot reproduce the video scene files in this state of FIG. 1(b). This is ascribed to the characteristics of the DVD player that is designed to assume the reproduction of DVD-ROM disks produced by prepress. The DVD-ROM format describes that video information and so on are recorded in spiral from the inner to outer periphery. In order for the DVD player to reproduce both types of format even when data is recorded on the DVD-R disk, it is necessary to continuously record from the inner periphery without including non-recorded portions as in the DVD-ROM format disk.

In order that the user can completely record data (files) on a disk and reproduce the disk on DVD player with good compatibility to both formats, it is necessary to finalize that disk. When the disk is finalized, the finally updated intermediate IFO file N (represented by 7) is newly added in a format based on the DVD-ROM format as final management information (hereafter, called final IFO file 8), as shown in FIG. 1 at (c). The DVD player reproduces this final IFO file 8, thus acquiring the file structure on the disk so that it can access to each video data. The non-recorded portions are filled with dummy data 9 so that the recording space can be continuously occupied by some data. Under this condition the DVD player can reproduce the DVD-R disk.

Figure 2:
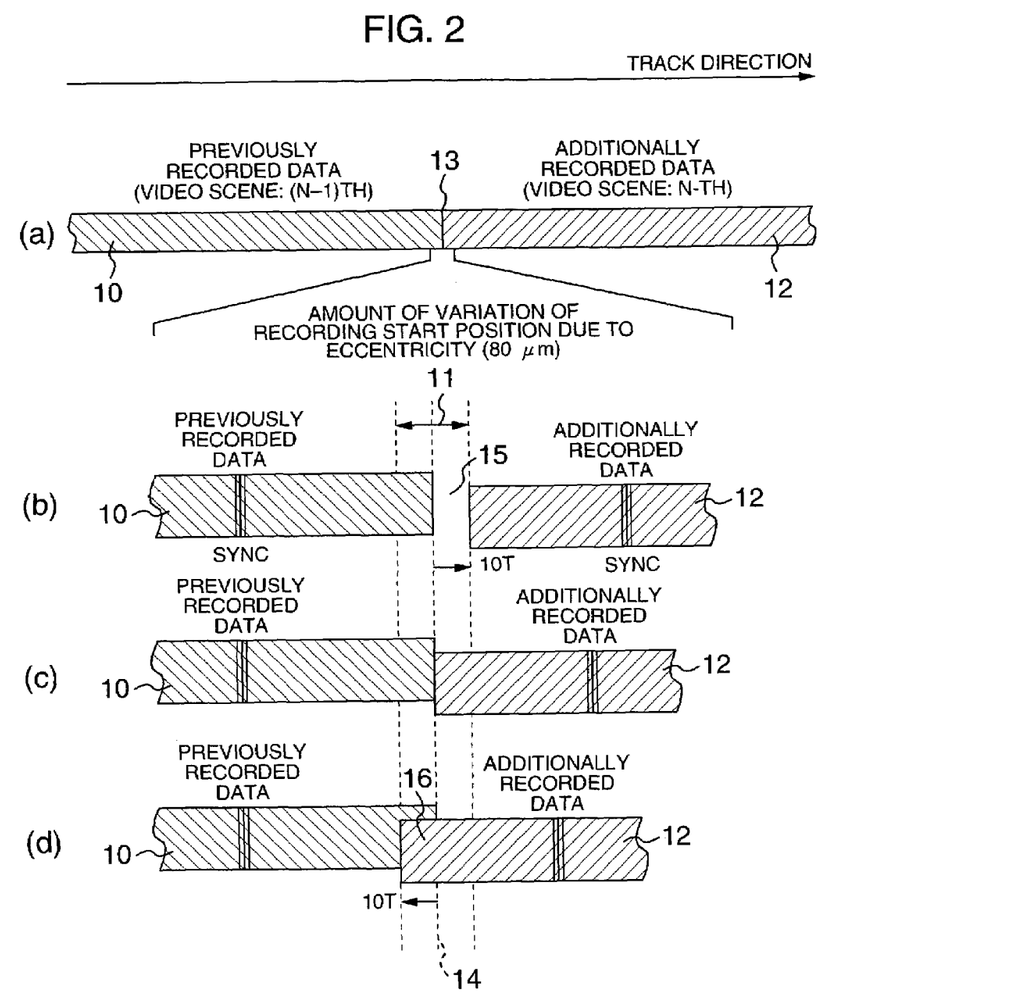
FIG. 2 is a diagram showing the linking portions caused between the files.

When IFO files and video scene files are recorded in turn, junctions called linking are produced between these files. This linking will be further described with reference to FIG. 2. FIG. 2 shows examples of a disk 80 μm eccentric.

FIG. 2(a) schematically shows a linking portion formed on the disk when a video scene file is additionally recorded. The closing end of recorded data 10 at the previous ((N−1)th) location is connected to the beginning end of recorded data 12 at the (Nth) location of video data by a linking portion 13 as shown in FIG. 2 at (a).

In order for the DVD player to reproduce a disk with good compatibility and high reliability, it is ideally necessary that the disk have the linking shown in FIG. 2 at (c). However, the linear speed on the track varies by the effect of the disk's eccentricity even if the disk rotates at a uniform speed. Thus, when data is recorded on the basis of a synchronizing signal obtained from the disk, a non-recorded gap portion 15 as shown in FIG. 2(b) or conversely an overlap portion 16 of both data is produced as shown in FIG. 2(d).

In case the write-once recording medium such as DVD-R, when recorded as in FIG. 2(d), overlap portion 16 destroys recorded data so that capacity of error correction according to ECC (Error Correcting Code) becomes decrease. Extension of the interval of the overlap portion 16 will also affect the servo control. When we try to reduce the overlap 16 to the minimum not to affect the servo control in order that the error correction can be made according to ECC, the non-recorded gap 15 contrarily becomes easy to occur.

The originally recorded data of the overlap 16 of data, when tried to record on the write-once recording medium like DVD-R, is destroyed together with the overwritten data. In a prior art considering this problem as disclosed in JP-A-9-270171, the ECC block including the linking portion is skipped over as dummy data not to be read or dummy data is inserted only in the vicinity of the linking portion to reduce the lack of information to the minimum. Here, the dummy data indicates meaningless data different from meaningful data such as video data and management information.

In addition, when the non-recorded gap 15 is produced between data and data, both the original data and the added data are not destroyed, but servo control cannot be activated by the non-recorded portion so that the recorded information cannot be properly read out because the playback-only DVD player employs the DPD (Differential Phase Detection)-type servo control that uses recorded marks.

In another prior art considering this problem as disclosed in JP-A-11-25459, the start end portion of the data to be additionally written continuous to the closing end of the previously recorded data is overlapped thereon so that the non-recorded gap cannot be produced when the DVD player reproduces a recordable type recording medium.

SUMMARY ON THE INVENTION

In the prior arts, however, when files of small data such as IFO file are written one after another, high linking precision sometimes cannot be maintained. The reason for this will be given below.

The IFO files and video scene files, when recorded in turn, need to be synchronized with any reference signal in order to generate the timing for recording-start positions. This reference signal is based on a synchronizing signal (SYNC). The SYNC has two kinds of signals, and thus there are recording methods using that SYNC. The first method employs a synchronizing signal (for example, LPP-SYNC) previously recorded on disk. The second method employs another synchronizing signal (for example, SYNC code) included in the previously recorded data.

In general, the rate of detecting the LPP-SYNC is low in the previously data-recorded area. Therefore, the SYNC code included within the previously recorded data is used to synchronize, thus generating the timing signal for the recording start positions.

We found that this recording method in which the timing signal for the recording start positions is generated by synchronizing with the SYNC code included within the data has the possibility that the amount of variation of the linking portion is increased as the files of small data, for example, IFO files to be recorded in the management information region 2 are repeatedly recorded in turn. The mechanism for this generation will be described with reference to FIG. 3.

Figure 3:
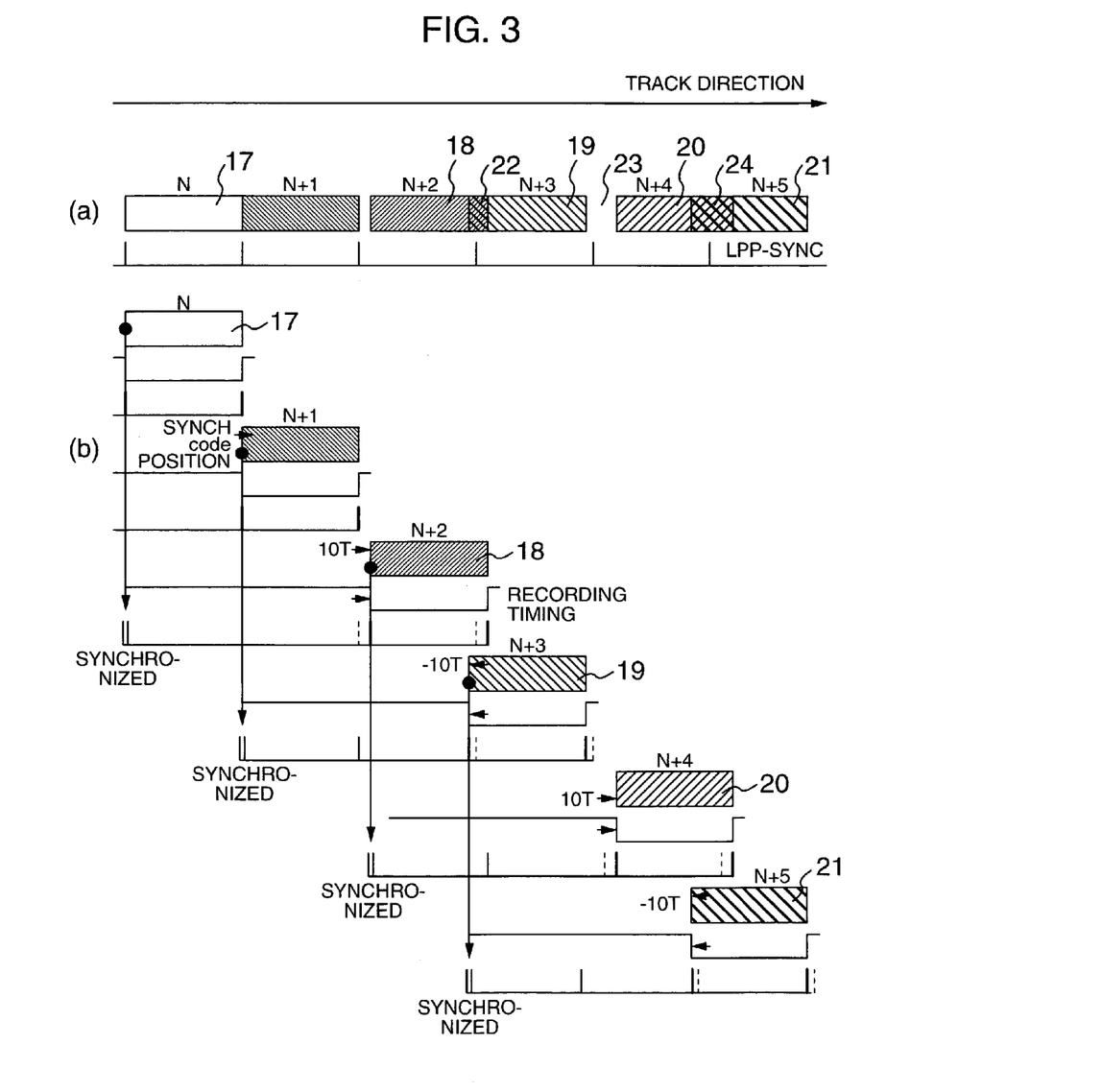
FIG. 3 is a diagram showing the variations of the lengths of the linking portions.

FIG. 3(a) is a diagram showing an example of the variation of linking portion that is generated when the management information is recorded one after another. FIG. 3(b) shows the variations of synchronizing positions and recording start positions for the timing generation when the management information is recorded in turn.

In FIG. 3, it is assumed that the maximum variation of the recording start positions is ±10T (T is the shortest information width), and that the Nth data 17 is correctly located relative both to the LPP-SYNC and to the SYNC code included within the previously recorded data. In addition, the timing for determining the recording start position is assumed to generate in synchronism with the SYNC code located before two pieces of data before. Moreover, for the convenience of explanation, all the amounts of Nth data~(N+5)th data are assumed to be equal.

Here, we assumed that the recording start timing signals for (N+2)th data 18 and (N+4)th data 20 generated in synchronism with the SYNC codes located before two pieces of data have 10T of variation in the direction in which the recording start positions delay, and that the recording start timing signals for (N+3)th data 19 and (N+5)th data 21 generated similarly have 10T of variation in the direction in which the recording start positions advance.

Although the amount of variation in the recording start positions of the first and second recorded data is 10T, an overlap 22 of 20T is produced in the linking portion between the (N+2)th data 18 and (N+3)th data 19, a non-recorded gap of 30T is produced in the linking portion between the (N+3)th data 19 and (N+4)th data 20, and an overlap 24 of 40T is produced in the linking portion between the (N+4)th 20 and (N+5)th data 21 as shown in FIG. 3 at (a). From FIG. 3, it will be seen that the variation of the linking portion is increased as the data is recorded in turn.

This large variation is caused by the fact that the data for generating the recording start timing is generated in synchronism with the SYNC code of the data recorded prior to a plurality of (more than two) time. In general it is necessary that the synchronization for the generation of recording start position timing be started to count 2 to several tens of ECC blocks (ECC block is the recording unit of data to be recorded on disk) before the recording start position. This is required in order to prevent SYNC from being not detected or erroneously detected due to defects of the recorded data and to assure the reliability of the SYNC detection.

Therefore, when data such as management information of which the amount is as small as 1~2 ECC blocks is recorded in turn, the data becomes easy to be affected by the variation of the recording start positions of the recorded data, and thus it is greatly changed in its recording start position as compared with the data of which the amount is large like the video scene files.

Particularly, the present inventors found that when recording the final IFO8 shown in FIG. 1, the above-mentioned problem could be caused so that some DVD player could not properly read the management information, thus not recognizing the disk.

Accordingly, it is an object of the invention to provide an information recording technique capable of suppressing the variations of data recording positions such as the overlap of data on data and the gap between data and data, thus improving the reliability of data reproduction.

In order to achieve the above object, the present invention proposes an information recording method for recording data on a write-once information-recording medium according to a synchronizing signal produced from the information recording medium, wherein dummy data is recorded on the medium so that management information for managing the data can be recorded on the medium on the basis of the synchronizing signal included within the dummy data.

Moreover, the present invention proposes another information recording method for recording data of certain recording units on a write-once information-recording medium, wherein data is recorded, and dummy data of more than at least two recording units and management data for managing the above data are recorded by a single recording operation on the basis of a synchronizing signal produced from the information recording medium.

Other objects, features and advantages of the invention will become apparent from the following description of the embodiments of the invention taken in conjunction with the accompanying drawings.

DESCRIPTION OF THE EMBODIMENTS

Description will be made of an information recording apparatus according to the first embodiment of the invention, or an example of DVD camera for recording video scenes (moving pictures) and still images on DVD-R disk. We often use DVD cameras to shoot a number of times video scenes of tens of seconds units and still images. That is, since the number of times that video scenes or still images are shot one after another is larger than in other recording apparatus, the DVD camera is most suitable for the invention to be applied to. However, of course the invention can also be applied to other information recording apparatus, for example, DVD recorder.

Figure 4:
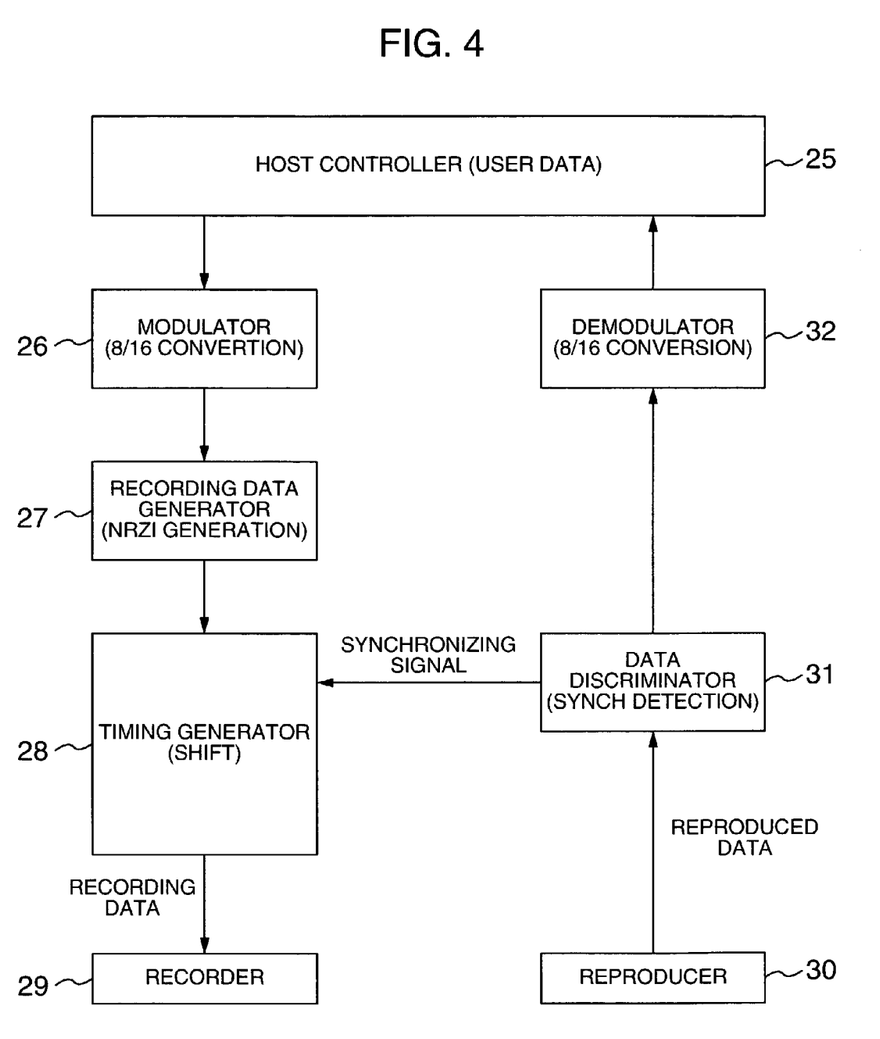
FIG. 4 is a block diagram of the construction of a portion associated with the recording of data to DVD-R, of a DVD camera of an embodiment of the present invention.

FIG. 4 is a block-diagram of a portion associated with the recording of data to DVD-R, of a DVD camera as the first embodiment of the invention. This portion according to this embodiment includes a host controller 25, a modulator 26, a recording data generator 27, a timing generator 28, a recorder 29, reproducer 30, a data discriminator 31, and a demodulator 32. A control circuit, though not shown, such as CPU, controls each block element.

The host controller 25 is the source of information to be recorded. In other words, video scene data produced by the camera portion not shown, management information and dummy data are transferred from the host controller 25 to the modulator 26. Also, the demodulated data from the demodulator 32 is transferred to the host controller 25. The dummy data is meaningless data unlike the meaningful data such as the video data and management data.

The operation at the time of recording will be mentioned. The host controller 25 supplies the video scene data, management information and dummy data to the modulator 26. The modulator 26 adds error correction code (ECC) to the data being recorded, and thus converts this data into data of another format. For example, it converts 8-bit data into 16-bit data, or makes 8/16-bit conversion. The recording data generator 27 generates recording data of binarized NRZI pulse format of Hi-levels and Lo-levels on the basis of the 16-bit data converted from the 8-bit data. The NRZI signal of data to be recorded is transmitted to the recorder 29 in synchronism with a recording timing signal generated from the timing generator 28. The timing generator 28 generates the recording timing signal on the basis of a synchronizing signal from the data discriminator 31. The recording data synchronized with the synchronizing signal in the timing generator 28 is sequentially transmitted to the recorder 29. The recorder 29 has an optical head that includes a semiconductor laser drive circuit, a semiconductor laser, an optical system and a moving mechanism. The recording data is sent to the semiconductor laser drive circuit, thus driving the semiconductor laser to emit laser light. The laser beam emitted from the optical head irradiates the recording film surface of the optical disk, thus creating recorded marks. The dummy data is not transferred from the host controller 25, but may be previously stored in the modulator 26.

The reproducer 30 reads the recorded data from the optical disk. The reproducer 30 has the same optical head as the recorder 29. It causes laser light weaker than at the recording time to be focused on the recorded optical disk, and detects the reflected light from the optical disk that is modulated by the recorded marks. The reproducer 30 then produces the reproduced data from the disk, and servo signals necessary for tracking and focus control. The data discriminator 31 discriminates the reproduced data to produce a synchronizing signal (SYNC pattern) indicating the demodulation start points of data and user data such as video information. The demodulator 32 demodulates the user data and supplies it to the host controller 25. The data discriminator 31 may detect the synchronizing signal (for example, LPP-SYNC) previously recorded on the disk or the synchronizing signal (for example, SYNC code) included within the previously recorded data. However, it is preferable to detect the synchronizing signal included within the previously recorded data because the synchronizing signal previously recorded on the disk is difficult to reproduce after the recording of data.

The modulator 26, recording data generator 27, timing generator 28, data discriminator 31 and demodulator 32 may be constructed by hardware using circuits or by software using programs.

Figure 5A:
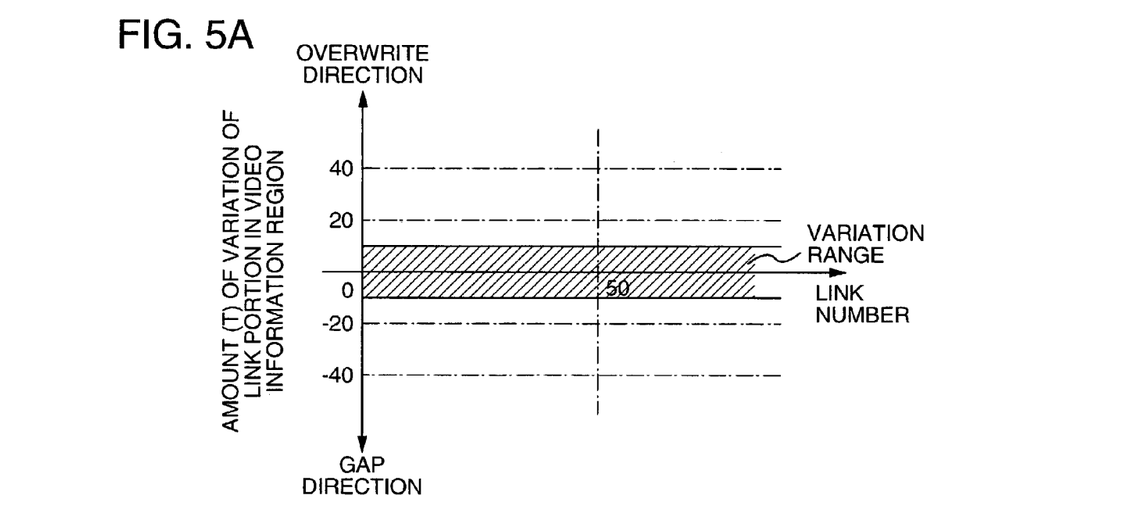
FIGS. 5A and 5B are diagrams showing the variation width of the linking portion relative to the linking number in each recording region.

The video scene is recorded 50 times as user data on the disk by the camera of the host controller 25, and also the intermediate IFO is updated 50 times on the disk. The variation of the recording start position per linking is ±10T. The variation range of linking portions in the video information region is not increased even when data is additionally recorded one after another as shown in FIG. 5A. The reason is that since the video information has a large amount of data and thus has a number of ECC blocks (ECC blocks are units of data to be recorded on the disk in this embodiment) recorded by a single operation, the recording start timing of data to be additionally recorded one after another is generated from the just previously recorded video data that does not include any linking portion.

However, the IFO file recorded at a time as the management information has 2 ECC blocks. The recording start timing for the IFO file is generated from the IFO file already recorded a plurality of files before, and thus it is determined to integrate the linking errors in that portion.

Figure 5B:
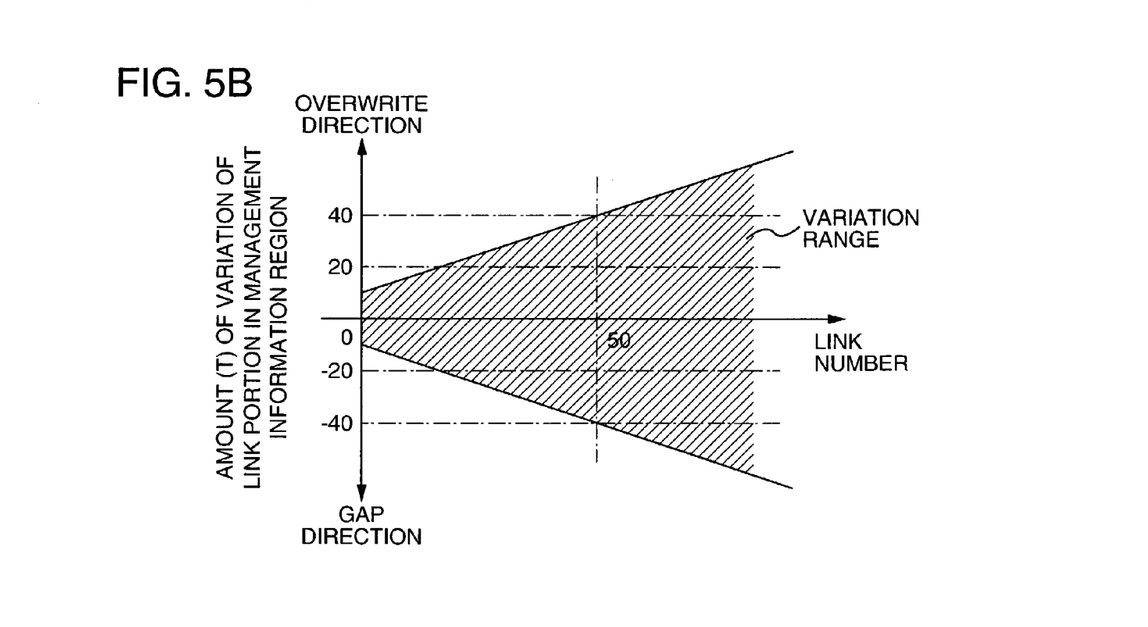

Therefore, the variation range of the linking portion is increased as the files are additionally recorded one after another as shown in FIG. 5B. This problem was not found in the additional recording of data made so far because data is often additionally recorded for show programs and sound, in which case the number of times that the video and sound are recorded on and off is small or once or twice. The present inventors have found and clarified the problem for the first time.

The experiment by the inventors revealed that the final IFO recorded 50 scenes after at the time of finalizing has sometimes a linking variation of up to about 40T. In addition, from the experiment, it was found that some DVD player couldn't properly reproduce DVD when the gap width of linking portion exceeds about 30T.

Therefore, in order to improve the reliability of data reproduction in DVD player, it is necessary that the variation of linking portion in the final IFO that the DVD player reproduces be reduced to less than 30T.

Figure 6:
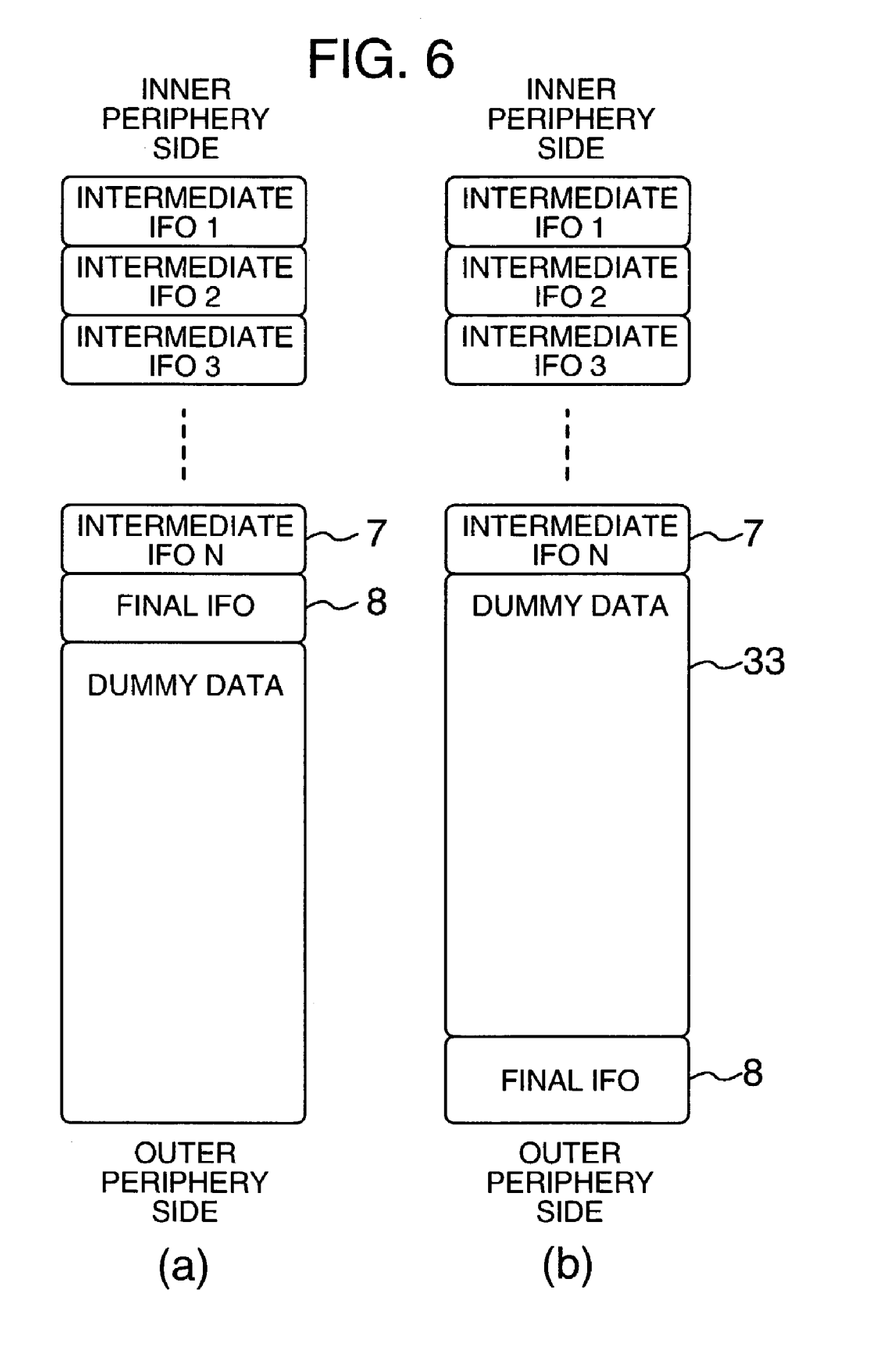
FIG. 6 is a diagram showing the positional relation of files in the first embodiment of the invention.
Figure 7:
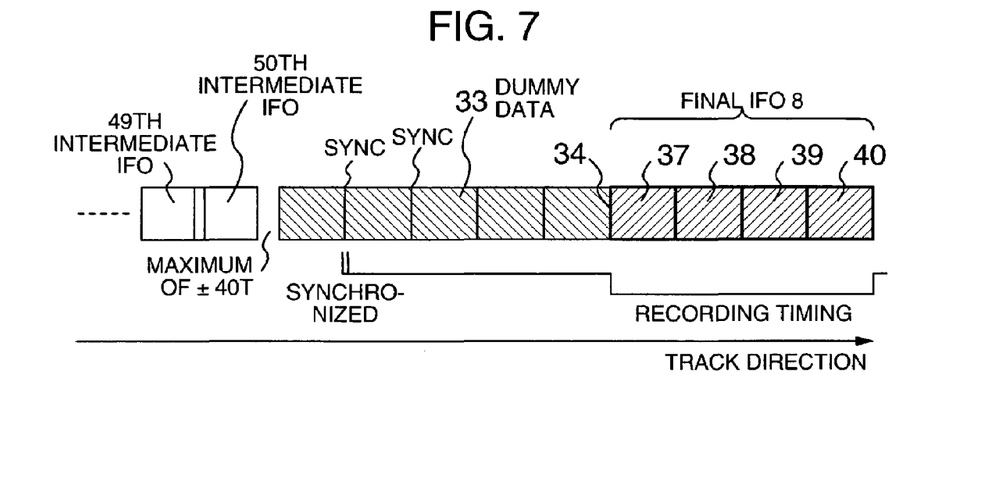
FIG. 7 is a conceptual diagram of the recording operation in the first embodiment.

In the information recording apparatus of this embodiment, the dummy data is not inserted after the final IFO as shown in FIG. 6 at (a), but dummy data 33 is inserted between the intermediate IFO 7 and the final IFO 8 as shown in FIG. 6 at (b) while data is being recorded on the DVD-R. The amount of dummy data 33 is set to be the number of blocks necessary for the optical disk apparatus to generate the recording start timing, more specifically, more than two recording units, for example, 2 ECC blocks. When the intermediate IFO files, final IFO file and dummy data are arranged as shown in FIG. 6 at (b), the concept of the operation at the time of recording the final IFO 8 is shown in FIG. 7.

An overlap or gap portion of at most ±40T is produced between the intermediate IFO at the fiftieth scene and the dummy data 33. When the dummy data 33 is previously inserted, the recording start timing for recording the final IFO 8 (that is formed of VIDEO_TS.IFO file 37, VIDEO_TS.VOB FILE 38, VIDEO_TS.BUP FILE 39 AND VTS_01_0.IFO FILE 40) is synchronized by detecting the SYNC code within the dummy data 33. Thus, since the timing is generated from the just previously recorded data (dummy data 33) not containing any linking portion, it can be produced under the same condition as when the video scene files of large data are recorded on and off. Therefore, the precision of linking portion is equivalent to that shown in FIG. 5 at (a), and the variation 34 of the linking portion of the final IFO can be reduced to ±10T. Thus, the reliability of data reproduction can be improved.

The embodiment mentioned here aims to improve the reliability of the compatible reproduction in which the DVD player reproduces the data recorded by DVD camera. In order to improve the reliability in the self-reproduction that the player makes, the same technique can be used in the recording of intermediate IFO.

When the final IFO was recorded continuously to the intermediate IFO without inserting the dummy data as in the prior art, a variation of about 40T was caused in the linking portion of the final IFO at the probability of one to ten disks, and as a result some DVD player did not reproduce the disk. According to the results of the application of this embodiment, the variation could be reduced to about 10T in the linking portion of the final IFO, and thus the reproduction could be made without problem.

Figure 8:
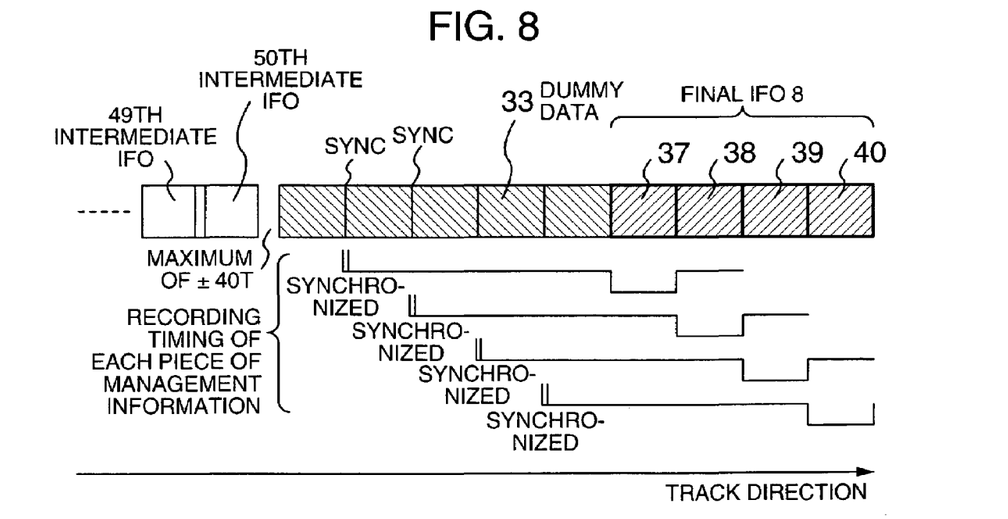
FIG. 8 is a diagram showing the positional relation of files in the second embodiment of the invention.

The second embodiment of the invention will be described below. The construction and operation of the information recording apparatus itself of this embodiment are the same as those of the first embodiment except that it uses a different data recording procedure, and thus will not be described. The second embodiment, when finalizing the disk, individually records the dummy data file 33, and VIDEO_TS.IFO file 37, VIDEO_TS.VOB file 38, VIDEO_TS.BUP file 39, and VTS_01_0.IFO file 40 that constitute the final IFO file 8. FIG. 8 shows the operation of this case. When data of each management information file is recorded, the reference positions in the recording timing are generated in synchronism with the SYNC code inserted within the same dummy data file 33. Thus, the conventional recording control can be used as it is. In addition, since the variations of the linking portions are at most ±20T, the DVD player can be used without problem. Since this recording method can be achieved by the existing recording control, the above-mentioned effect can be easily obtained as compared with the first embodiment.

Figure 9:
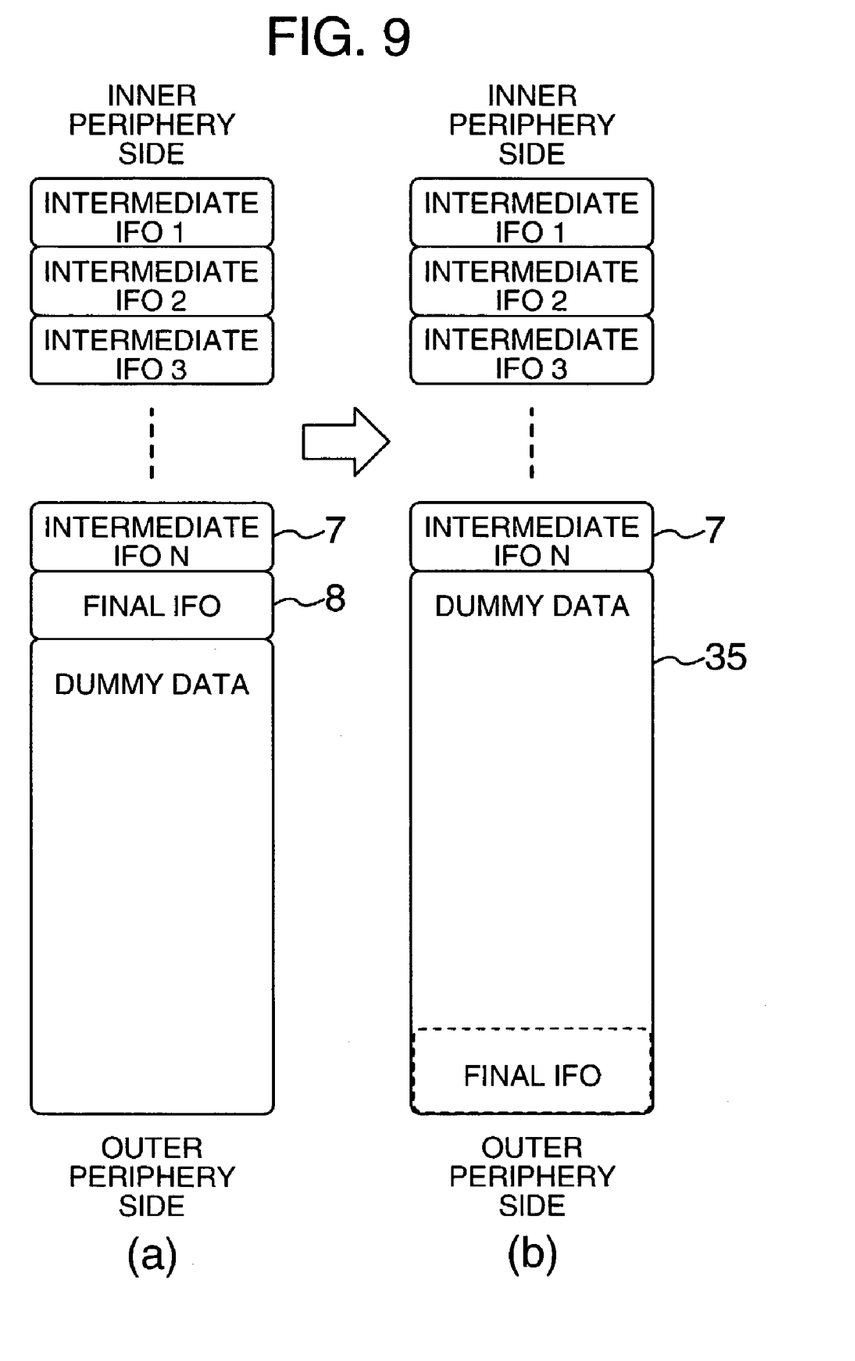
FIG. 9 is a conceptual diagram of the recording operation in the second embodiment.
Figure 10:
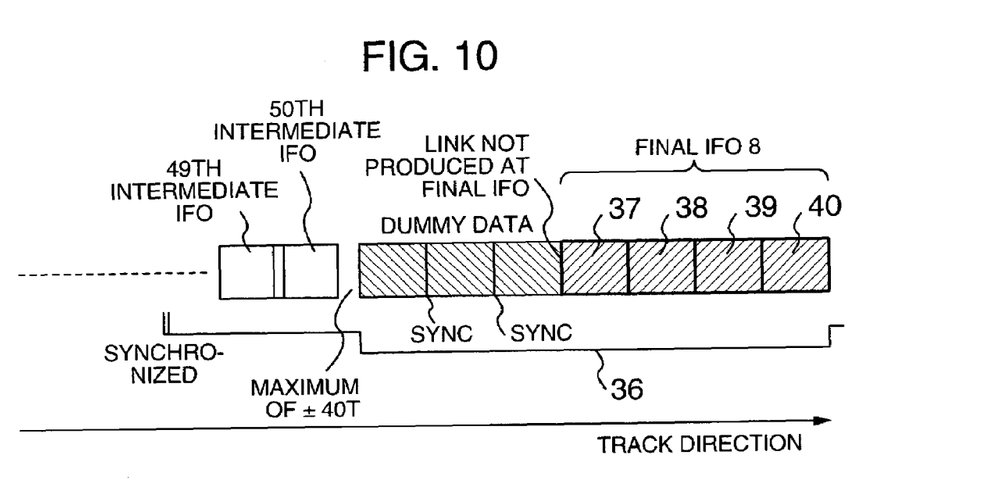
FIG. 10 is a conceptual diagram of the recording operation in the third embodiment.

The third embodiment of the invention will be described below. The construction and operation of the information recording apparatus itself of this embodiment are the same as those of the first embodiment as described about the second embodiment, and thus will not be described. The third embodiment does not insert the dummy data after the final IFO as shown in FIG. 9 at (a), but records the dummy data and final IFO at a time as single data 35 as shown in FIG. 9 at (b). FIG. 10 shows the operation of this case.

An overlap or gap of up to ±40T is produced between the intermediate IFO file at the fiftieth scene and the dummy data 33 though it is similar to the first and second embodiments. On the other hand, the dummy data and the final IFO are recorded as single data on the DVD-R. The recording start timing for recording the final IFO 8 (that is formed of VIDEO_TS.IFO file 37, VIDEO_TS.VOB file 38, VIDEO_TS.BUP file 39 and VTS_01_0.IFO file 40) is generated by detecting the SYNC code inserted within the already recorded intermediate IFO. In addition, no linking portion is produced between the dummy data and the final IFO, the third embodiment can have the effect that is equivalent to or more than that of the first embodiment.

While the final IFO file is recorded in this embodiment, the present invention can be naturally applied to any kind of data as far as data of shorter length than that required to count the recording timing is repeatedly recorded on and off.

Also, while the DVD-R is given as an example, the present invention can be applied to the recording of write-once recording media.

In addition, the information recording apparatus is not limited to the construction shown in FIG. 4, but may take any construction as long as the synchronizing signal is detected from the recording medium on which data is to be recorded, and is used to generate the recording timing so that data can be recorded according to the timing.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for recording data on a write-once information-recording medium, said method comprising:
producing dummy data comprising a synchronization signal;
recording said dummy data onto said information recording medium; and
recording management information onto said information recording medium a location following said dummy data determined based on said synchronization signal.

2. The method of claim 1, wherein said management information comprises a plurality of files and wherein said information-recording medium is a DVD-R.

3. The method of claim 2, wherein each of said plurality of files comprising said management information is recorded in a separate recording operation.

4. The method of claim 2, wherein said plurality of files of said management information are recorded in a single recording operation.

5. A method for recording data of predetermined recording units on a write-once information-recording medium, said information-recording medium having recorded thereon previously recorded synchronizing signals, said method comprising:

recording said data on said information-recording medium; and recording dummy data of at least two recording units in length on said information-recording medium, wherein said at least two recording units include one or more of said previously recorded synchronizing signals;

recording management information for managing said data on said information-recording medium at a location following said dummy data, said location determined based on said previously synchronizing signals included in said at least two recording units, wherein recording said dummy data and said management information is perfored in a single operation in synchronism with said previously recorded synchronizing signals.

6. The method of claim 5, wherein said predetermined recording units are ECC block units.

7. An information-recording apparatus for recording data on a write-once information-recording medium, said apparatus comprising:

means for producing dummy data comprising a synchronization signal;

means for recording said dummy data onto said information-recording medium; and means for recording data-management information onto said information-recording medium at a location following said dummy data determined based on said synchronizing signal.

8. An information-recording apparatus for recording data of predetermined recording units on a write-once information-recording medium said information-recording medium having recorded thereon previously recorded synchronizing signals, said apparatus comprising:

means for recording said data on said information-recording medium; and means for recording dummy data of at least two recording units in length on said information-recording medium, wherein said at least two recoding units include one or more of said previously recorded synchronizing signals; and means for recording data-management information that manages said data on said information-recording medium at a location following said dummy data, said location determined based on said previously recorded synchronizing signals included in said at least two recording units, wherein said dummy data and said data-management information are recorded in a single operation in synchronism with said previously recorded synchronizing signals.

9. The apparatus of claim 8, wherein said predetermined recording units are ECC block units.

10. The apparatus of claim 9, wherein said management information comprises a plurality of files and wherein said information-recording medium is a DVD-R.

11. The apparatus of claim 10, wherein each of said plurality of files of said management information is recorded in a separate recording operation.

12. The apparatus of claim 10, wherein said plurality of files of said management information are recorded in a single recording operation.

* * * * *